US011943047B2

(12) United States Patent
Kim

(10) Patent No.: US 11,943,047 B2
(45) Date of Patent: Mar. 26, 2024

(54) APPARATUS AND METHOD OF CRPA NEUTRALIZATION FOR ILLEGAL UNMANNED AERIAL VEHICLE

(71) Applicant: AGENCY FOR DEFENSE DEVELOPMENT, Daejeon (KR)

(72) Inventor: Jun O Kim, Daejeon (KR)

(73) Assignee: AGENCY FOR DEFENSE DEVELOPMENT, Daejeon (KR)

( * ) Notice: Subject to any disclaimer, the term of this patent is extended or adjusted under 35 U.S.C. 154(b) by 0 days.

(21) Appl. No.: 18/143,714

(22) Filed: May 5, 2023

(65) Prior Publication Data

US 2023/0361907 A1 Nov. 9, 2023

(30) Foreign Application Priority Data

May 6, 2022 (KR) ........................ 10-2022-0056196

(51) Int. Cl.
*H04K 3/00* (2006.01)

(52) U.S. Cl.
CPC ............... *H04K 3/415* (2013.01); *H04K 3/44* (2013.01)

(58) Field of Classification Search
CPC ...... G01S 19/21; G01S 19/215; G01S 19/015; G01S 19/23; G01S 19/36; G01S 5/0036; G01S 5/021; G01S 5/0221; G01S 5/0249; G01S 5/04; G01R 1/18; G01R 29/0821; G01R 31/001; H01Q 21/08; H04B 17/0085; H04B 17/27; H04W 4/029
USPC .............................................................. 455/1
See application file for complete search history.

(56) References Cited

U.S. PATENT DOCUMENTS

| | | | | |
|---|---|---|---|---|
| 6,744,408 | B1 * | 6/2004 | Stockmaster | G01S 19/22 342/13 |
| 7,873,095 | B1 * | 1/2011 | Stockmaster | H04K 3/28 375/132 |
| 2002/0039082 | A1 * | 4/2002 | Fox | H01Q 3/24 343/909 |
| 2008/0062039 | A1 * | 3/2008 | Cohen | G01S 19/29 342/357.29 |
| 2020/0049833 | A1 * | 2/2020 | Drummer | G01S 19/36 |
| 2020/0106545 | A1 * | 4/2020 | Askar | H04W 72/541 |
| 2020/0217927 | A1 * | 7/2020 | Kim | G01S 7/021 |
| 2020/0278418 | A1 * | 9/2020 | Lim | G05D 1/101 |
| 2020/0408823 | A1 * | 12/2020 | Gerten | G01S 19/23 |
| 2023/0101372 | A1 * | 3/2023 | Hou | H04K 3/228 380/270 |

(Continued)

FOREIGN PATENT DOCUMENTS

| | | | |
|---|---|---|---|
| JP | H10-93334 | A | 4/1998 |
| JP | 2001-111333 | A | 4/2001 |

(Continued)

*Primary Examiner* — Tan H Trinh
(74) *Attorney, Agent, or Firm* — Dilworth & Barrese, LLP; Michael J. Musella, Esq.

(57) ABSTRACT

An apparatus of controlled reception pattern antenna (CRPA) neutralization for an illegal unmanned aerial vehicle (UAV) includes an interference signal generator transmitting a direct wave toward a CRPA of an illegal UAV through a first transmission antenna and transmitting a first reflected wave inducing signal through a second transmission antenna and a first passive propagation mirror reflecting the first reflected wave inducing signal toward the illegal UAV so that the first reflected wave propagates toward the CRPA of the illegal UAV.

15 Claims, 7 Drawing Sheets

(56) References Cited

U.S. PATENT DOCUMENTS

| | | | | |
|---|---|---|---|---|
| 2023/0140048 | A1* | 5/2023 | Zangvil | G01S 19/03 342/464 |
| 2023/0231644 | A1* | 7/2023 | Korpi | H04K 3/228 455/296 |
| 2023/0247579 | A1* | 8/2023 | Hou | G01S 5/02526 455/456.1 |

FOREIGN PATENT DOCUMENTS

| | | | |
|---|---|---|---|
| KR | 10-1668196 | B1 | 10/2016 |
| KR | 10-2018-0033612 | A | 4/2018 |
| KR | 10-2020-0130072 | A | 11/2020 |
| KR | 10-2227468 | B1 | 3/2021 |
| KR | 10-2386778 | B1 | 4/2022 |

* cited by examiner

APPARATUS AND METHOD OF CRPA NEUTRALIZATION FOR ILLEGAL UNMANNED AERIAL VEHICLE

CROSS-REFERENCE TO RELATED APPLICATION

This application claims priority to and the benefit of Korean Patent Application No. 10-2022-0056196 filed in the Korean Intellectual Property Office on May 6, 2022, the entire contents of which are incorporated herein by reference.

BACKGROUND

(a) Field

Embodiments of the present invention relates to an apparatus and method of controlled reception pattern antenna (CRPA) neutralization for an illegal unmanned aerial vehicle (UAV).

(b) Description of the Related Art

Recently, technology of quadcopter-type drones or fixed-wing UAVs has been rapidly developed, which may have the advantage of pursuing convenience in various fields of society, such as transportation, logistics, and leisure, but it has also been reported through the media, etc., that the technology of small UAVs is used for purposes, such as terrorism or assassination of key figures in some specific areas or countries of conflict. For this reason, each country has sought various UAV countermeasure technologies to cope with the problems, and technologies from various perspectives, such as drone guns, jammers, and decoys have been applied.

In the case of small UAVs, such as drones, that use satellite navigation devices, UAVs with special missions tend to respond to electronic attacks by electronic counter-counter measure (ECCM) technology for global navigation satellite system (GNSS) based on array antennas called CRPA, along with the development of current digital signal processing technology. The CRPA technology is the latest equipment developed to remove a significant portion of interference signals by using N array elements and related adaptive signal processing technology, and some overseas companies have miniaturized the equipment and reduced power consumption thereof to a level that may be mounted on drones, etc., and some equipment is commercially available. It is known that the ECCM technology may enable stable satellite navigation signal reception, while removing or reducing received power for up to N−1 (N: the number of elements) GNSS interference signals to a significant level.

The satellite navigation device for processing interference signals may simultaneously cancel or suppress interference signals to a certain level for N−1 radio wave interference source, which is one less than the number of N antenna elements, and this is defined as a degree of freedom (DOF) condition. If the number of array antenna elements for an illegal UAVs increases in line with the miniaturization trend, there is a practical difficulty in operating more than N radio wave interference sources to correspond thereto. In addition, since not only the additional expansion of the radio wave interference source but also the power supply related to a radio frequency (RF) output of the interference signal source is an additional consideration, the technical limitations of the general response method of the related art are definite and the operational limitations are apparent.

For this reason, no specific technology has been known to neutralize CRPA, which is a satellite navigation device based on multiple elements mounted in small UAVs for illegal use, etc., and only a concept of distorting the null of an array antenna by transmitting various interference signals faster than a covariance calculation update period of an internal signal processing unit of a space time adaptive processing (STAP) algorithm for CRPA has been known. However, this is also a technique for inducing an effect on a specific direction or moment, and there is a limit to continuous effect. In addition, it is also technically impossible to neutralize a CRPA by operating the minimum number of physical RF interference signal sources with the number less than DOF (N−1).

SUMMARY

Embodiments of the present invention attempts to provide an apparatus and method of CRPA neutralization for illegal unmanned aerial vehicle (UAV) capable of neutralizing an illegal UAV equipped with a miniaturized CRPA by operating fewer physical RF interference signal sources (transmitters or jammers) than (N−1) interference signal sources, which is the degree of freedom (DOF) conditions of array antenna adaptive signal processing technology known as the number of simultaneous response interference signal sources.

According to an exemplary embodiment, an apparatus of controlled reception pattern antenna (CRPA) neutralization for an illegal unmanned aerial vehicle (UAV) includes: an interference signal generator transmitting a direct wave toward a CRPA of an illegal UAV through a first transmission antenna and transmitting a first reflected wave inducing signal through a second transmission antenna; and a first passive propagation mirror reflecting the first reflected wave inducing signal toward the illegal UAV so that the first reflected wave propagates toward the CRPA of the illegal UAV.

The first passive propagation mirror may be configured to rotate a reflector in an azimuth direction with respect to a first axis and tilt the reflector in an elevation direction with respect to a second axis.

The interference signal generator and the first passive propagation mirror may be located at a long distance on a line of sight so that the direct wave and the first reflected wave are incident on the CRPA of the illegal UAV in different directions.

The apparatus may further include: a second passive propagation mirror located in a different area from the interference signal generator and the first passive propagation mirror, wherein the interference signal generator may transmit a second reflected wave inducing signal through a third transmission antenna, and the second passive propagation mirror may reflect the second reflected wave inducing signal toward the illegal UAV so that the second reflected wave propagates toward the CRPA of the illegal UAV.

The apparatus may further include: a second passive propagation mirror located in a different area from the interference signal generator and the first passive propagation mirror, wherein the interference signal generator may receive a satellite signal through a reception antenna, amplify the satellite signal to generate a re-radiation signal, and transmit the re-radiation signal through a third transmission antenna, and the second passive propagation mirror may reflect the re-radiation signal toward the CRPA of the illegal UAV.

The interference signal generator may receive a satellite signal through a reception antenna, amplify the satellite signal to generate a re-radiation signal, and transmit the re-radiation signal toward the first passive propagation mirror through a third transmission antenna, and the first passive propagation mirror may reflect the re-radiation signal toward the CRPA of the illegal UAV.

According to another exemplary embodiment, an apparatus of controlled reception pattern antenna (CRPA) neutralization for an illegal unmanned aerial vehicle (UAV) includes: a first interference signal generator installed in a first area; a first passive propagation mirror installed in a second area; a second interference signal generator installed in a third area; and a second passive propagation mirror installed in a fourth area, wherein the first interference signal generator transmits a first direct wave toward the CRPA of the illegal UAV and transmits a first reflected wave inducing signal toward the first passive propagation mirror so that a first reflected wave propagates toward the CRPA of the illegal UAV, and the second interference signal generator transmits a second direct wave toward the CRPA of the illegal UAV and transmits a second reflected wave inducing signal toward the second passive propagation mirror so that a second reflected wave propagates toward the CRPA of the illegal UAV.

The first interference signal generator may amplify a satellite signal received through a reception antenna to generate a first re-radiation signal, and transmit the first re-radiation signal toward the first passive propagation mirror so that the first re-radiation signal reflected by the first passive propagation mirror propagates toward the CRPA of the illegal UAV.

The second interference signal generator may amplify a satellite signal received through a reception antenna to generate a second re-radiation signal, and transmit the second re-radiation signal toward the second passive propagation mirror so that the second re-radiation signal reflected by the second passive propagation mirror propagates toward the CRPA of the illegal UAV.

According to another exemplary embodiment, a method of CRPA neutralization for an illegal unmanned aerial vehicle (UAV) includes: transmitting a direct wave, by an interference signal generator installed in a first area, to a CRPA of an illegal UAV and transmitting a first reflected wave inducing signal to a first passive propagation mirror installed in a second area; and reflecting, by the first passive propagation mirror, the first reflected wave inducing signal toward the illegal UAV so that the first reflected wave propagates toward the CRPA of the illegal UAV.

The method may further include: transmitting, by the interference signal generator, a second reflected wave inducing signal toward a second passive propagation mirror installed in a third area; and reflecting, by the second passive propagation mirror, the second reflected wave inducing signal toward the illegal UAV so that the second reflected wave propagates toward the CRPA of the illegal UAV.

The method may further include: receiving, by the interference signal generator, a satellite signal through a reception antenna, amplifying the satellite signal to generate a re-radiation signal, and transmitting the re-radiation signal toward a second passive propagation mirror installed in a third area; and reflecting, by the second passive propagation mirror, the re-radiation signal toward the CRPA of the illegal UAV.

The method may further include: receiving, by the interference signal generator, a satellite signal through a reception antenna, amplifying the satellite signal to generate a re-radiation signal, and then transmitting the re-radiation signal toward the first passive propagation mirror; and reflecting, by the first passive propagation mirror, the re-radiation signal toward the CRPA of the illegal UAV.

According to another exemplary embodiment, a method of controlled reception pattern antenna (CRPA) neutralization for illegal unmanned aerial vehicle (UAV) includes: transmitting, by a first interference signal generator installed in a first area, a first direct wave to a CRPA of an illegal UAV and transmitting a first reflected wave inducing signal to a first passive propagation mirror installed in a second area; reflecting, by the first passive propagation mirror, the first reflected wave inducing signal toward the illegal UAV so that the first reflected wave propagates toward the CRPA of the illegal UAV; transmitting, by a second interference signal generator installed in a third area, a second direct wave toward the CRPA of the illegal UAV and transmitting a second reflected wave inducing signal toward a second passive propagation mirror installed in a fourth area; and reflecting, by the second passive propagation mirror, the second reflected wave inducing signal toward the illegal UAV so that the second reflected wave propagates toward the CRPA of the illegal UAV.

The method may further include: amplifying, by the first interference signal generator, a satellite signal received through a reception antenna to generate a first re-radiation signal, and then transmitting the first re-radiation signal toward the first passive propagation mirror; and reflecting, by the first passive propagation mirror, the first re-radiation signal toward the CRPA of the illegal UAV.

The method may further include: amplifying, by the second interference signal generator, a satellite signal received through a reception antenna to generate a second re-radiation signal, and then transmitting the second re-radiation signal toward the second passive propagation mirror; and reflecting, by the second passive propagation mirror, the second re-radiation signal toward the CRPA of the illegal UAV.

As a method of neutralizing a CRPA using a relatively small number of high-power RF interference signal sources in the DOF condition, excellent operational efficiency of increasing the number of interference signal sources is obtained even without an additional operation of physical RF high-power amplifier equipment by introducing a radio wave reflection mirror for GNSS An attempt to neutralize a CRPA mounted on an illegal UAV in reality by simply relying on an output of a jamming signal requires large-capacity, high-power RF equipment, but when the DOF conditions of the CRPA are used, the operation of a signal processing algorithm of the CRPA may be disabled even with an extremely low output, compared to the case of using a single interference signal source (jammer). In addition, by making full use of this point, the nation's main assets and human life may be effectively protected from the threat of illegal UAVs effective in a non-powered and maintenance-free manner by using fewer jammers and radio wave reflection mirrors for GNSS.

DETAILED DESCRIPTION

Figure 1:
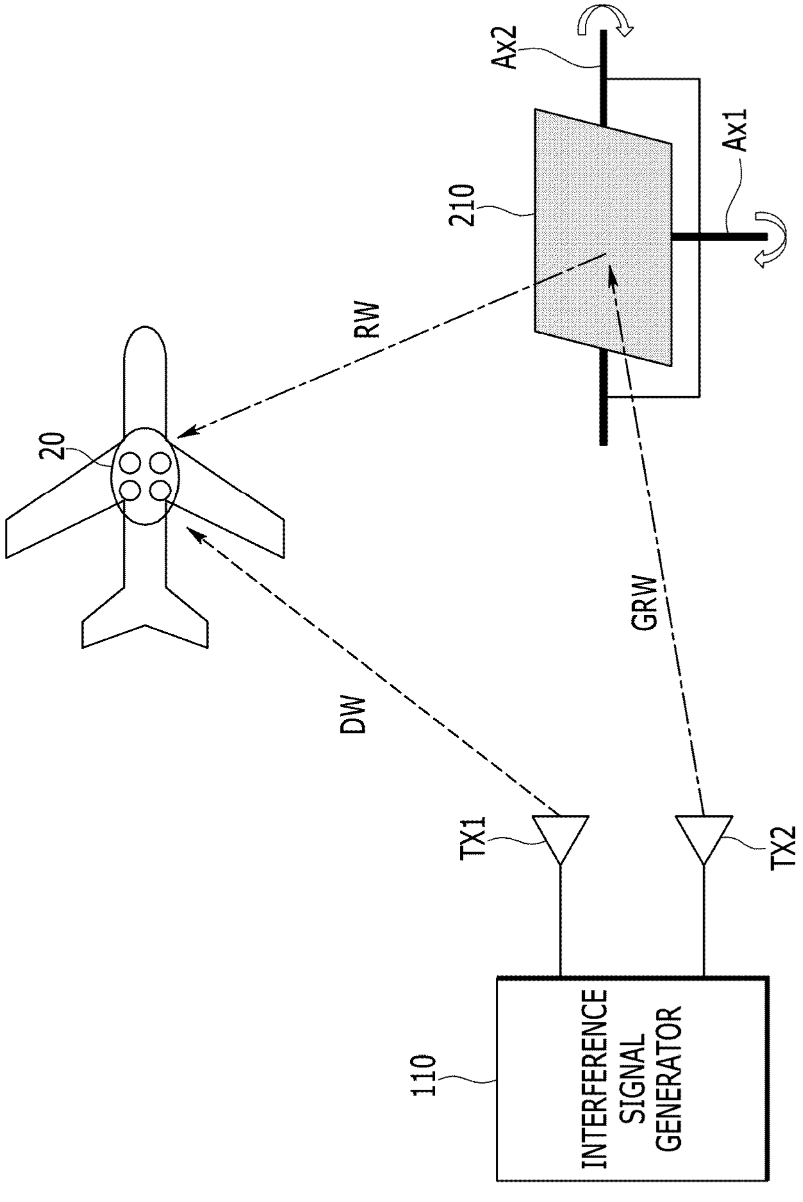
FIG. 1 is a view illustrating an apparatus of controlled reception pattern antenna (CRPA) neutralization for an illegal unmanned aerial vehicle (UAV) according to an exemplary embodiment of the present invention.

Exemplary embodiments of the present invention will be described in detail below with reference to the accompanying drawings so that those skilled in the art to which the present invention pertains may easily carry out the exemplary embodiments. The present invention may be embodied in many different forms and is not limited to the exemplary embodiments described herein.

Portions unrelated to the description may be omitted in order to more clearly describe the present invention, and the same or similar components may be denoted by the same reference numerals throughout the present specification.

In addition, unless explicitly described to the contrary, the word "comprise", and variations, such as "comprises" or "comprising", will be understood to imply the inclusion of stated elements but not the exclusion of any other elements.

Hereinafter, a CRPA neutralization device for an illegal unmanned aerial vehicle (UAV) according to an exemplary embodiment of the present invention will be described with reference to FIGS. 1 to 3.

FIG. 1 is a view illustrating an apparatus of controlled reception pattern antenna (CRPA) neutralization for an illegal unmanned aerial vehicle (UAV) according to an exemplary embodiment of the present invention. FIG. 2 is a view illustrating a passive propagation mirror according to an exemplary embodiment of the present invention. FIG. 3 is a view illustrating a reflected wave generating region and an effective gain of a passive propagation mirror according to an exemplary embodiment of the present invention.

Figure 2:
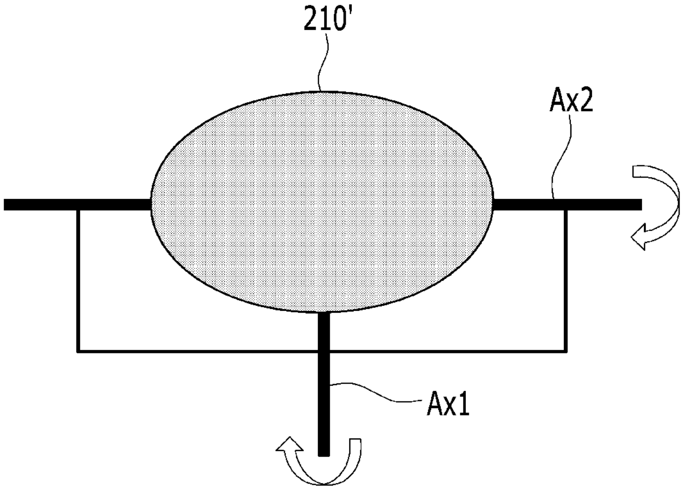
FIG. 2 is a view illustrating a passive propagation mirror according to an exemplary embodiment of the present invention.
Figure 3:
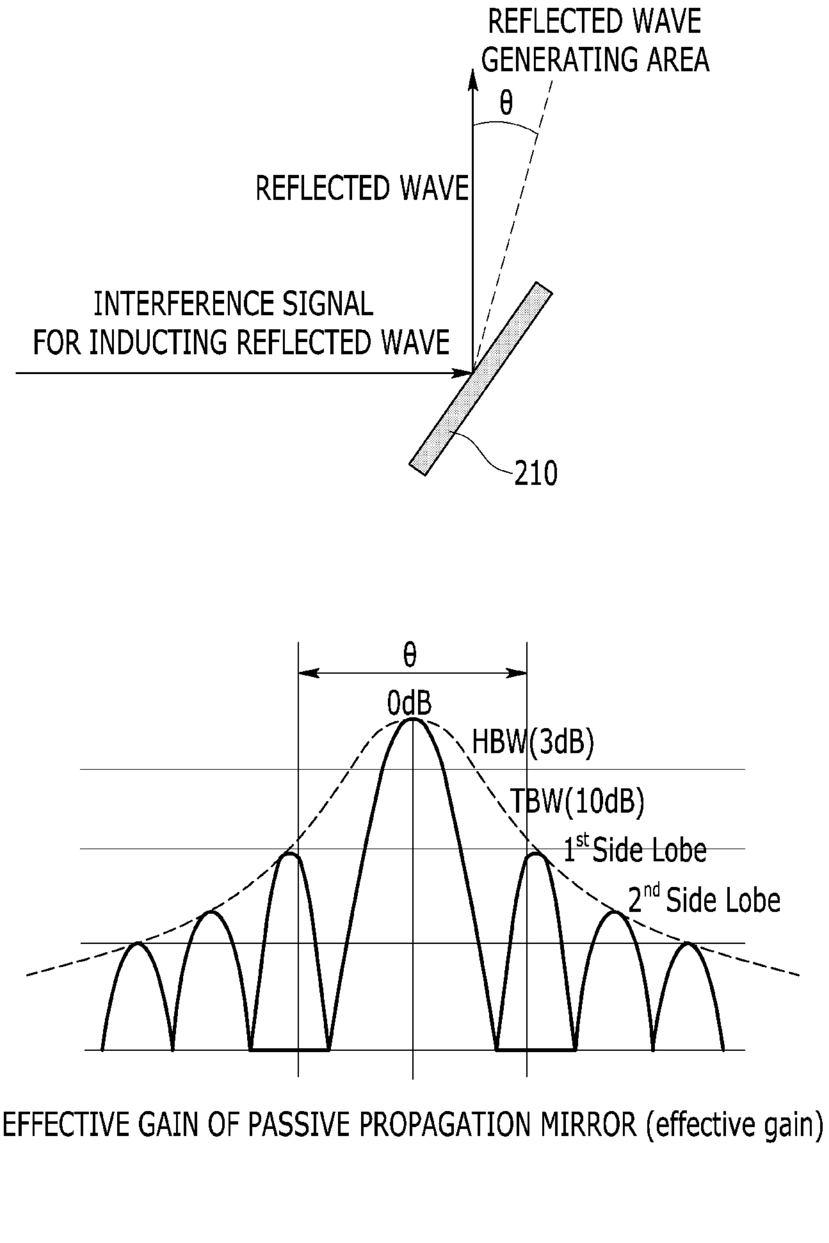
FIG. 3 is a view illustrating a reflected wave generating region and an effective gain of a passive propagation mirror according to an exemplary embodiment of the present invention.

Referring to FIGS. 1 to 3, an illegal UAV (e.g., a drone) may be equipped with a controlled reception pattern antenna (CRPA) 20, which is a satellite navigation device based on multiple elements. In other words, the illegal UAV may be an unauthorized threat target aero vehicle equipped with a satellite navigation device to which the CRPA 20 based on an operable N-element array antenna is applied.

In order to neutralize the CRPA 20 of such an illegal UAV, the apparatus of CRPA neutralization for an illegal UAV according to an exemplary embodiment of the present invention may include an interference signal generator 110 and a passive propagation mirror 210.

The interference signal generator 110 may transmit a direct wave DW toward the CRPA 20 of the illegal UAV through a first transmission antenna TX1, and transmit a reflected wave inducing signal GRW toward the passive propagation mirror 210 through a second transmission antenna TX2.

The interference signal generator 110 may adjust a propagation direction of the direct wave DW and a propagation direction of the reflected wave inducing signal GRW by mechanically moving the first transmission antenna TX1 and the second transmission antenna TX2. That is, the interference signal generator 110 may adjust the propagation direction of the direct wave DW and the propagation direction of the reflected wave inducing signal GRW by mechanical beam steering.

Alternatively, each of the first transmission antenna TX1 and the second transmission antenna TX2 may be an array antenna including a plurality of antenna elements, and the interference signal generator 110 may adjust the propagation direction of the direct wave DW and the propagation direction of the reflected wave inducing signal GRW by adjusting signals input to the plurality of antenna elements. That is, the interference signal generator 110 may adjust the propagation direction of the direct wave DW and the propagation direction of the reflected wave inducing signal GRW through electrical beam steering or beamforming.

The passive propagation mirror 210 may reflect the reflected wave inducing signal GRW propagated from the interference signal generator 110 toward the CRPA 20 of the illegal UAV, so that the reflected wave RW directly propagates toward the CRPA 20 of the illegal UAV. The passive propagation mirror 210 may be configured to rotate a reflector in an azimuth direction with respect to a first axis Ax1 and tilt the reflector in an elevation direction with respect to a second axis Ax2 in a non-powered manner so that the reflected wave RW may be reflected/propagate in a desired direction. A direction in which the passive propagation mirror 210 reflects/propagates the reflected wave RW may be fixed according to a positional relationship with the interference signal generator 110. Alternatively, according to an exemplary embodiment, the passive propagation mirror 210 may rotate or tilt the reflector according to remote control of the interference signal generator 110 or a central control center (not shown) to change a reflected/propagated direction of the reflected wave RW.

The interference signal generator 110 and the passive propagation mirror 210 may be located in different regions or at a long distance on a line of sight (LOS). Accordingly, the direct wave DW and the reflected wave RW may be incident on the CRPA 20 of the illegal UAV in different directions. The direct wave DW and the reflected wave RW are interference signals that are incident in different directions and neutralize the CRPA 20 of the illegal UAV.

In order to neutralize a navigation device for an illegal UAV equipped with a CRPA, interference signal generating equipment of high power ranging from tens of kilowatts to hundreds of kilowatts is required, depending on the performance of the CRPA. In addition, an illegal UAV attack may be handled only when the number of interference signal generating equipment proportional to the number of installed CRPA array elements is spatially distributed and arranged. However, it may be difficult to respond to illegal UAVs in a situation in which the interference signal generating equipment should be operated in a mountainous terrain where it is not easy to operate the interference signal generating equipment or in an area in which it is impossible to operate a high-capacity generator. In this case, by installing the passive propagation mirror 210 according to an exemplary embodiment of the present invention in a mountainous terrain or an area in which it is impossible to operate a high-capacity generator, the number of interference signals for neutralizing the CRPA 20 of an illegal UAV may be easily increased.

FIG. 1 illustrates the passive propagation mirror 210 in which a reflector has a rectangular shape. An effective area of the passive propagation mirror 210 in which the reflector has a rectangular shape may be a width and height of the reflector.

According to an exemplary embodiment, as shown in FIG. 2, a passive propagation mirror 210' having a circular reflector may be used to adjust a beam width or the like for a radiation pattern. An effective area of the passive propagation mirror 210' having a circular reflector may be an area of a circle. Hereinafter, the passive propagation mirror 210 having a rectangular reflector will be described as an example.

The reflected wave RW reflected by the passive propagation mirror 210 and propagated to the CRPA 20 may be reflected in a beam pattern design of the passive propagation mirror 210 required for an operational area in which the CRPA 20 is to be neutralized in consideration of a 3 dB bandwidth HBW and a dB bandwidth TBW from a radiation pattern indicated in the effective gain of the passive propagation mirror illustrated in FIG. 3. Equation 1 is a relational equation for calculating a gain of an ideal case for the effective gain of the passive propagation mirror, and in practice, the performance may be predicted by applying an effective reflection gain considering reflection efficiency expressed in Equation 2 expressed in decibels.

$$G_P = \frac{4\pi A}{\lambda^2} \quad \text{(Equation 1)}$$

$$G'_P[dB_i] = 20\log\left(\frac{4\pi A_e}{\lambda^2}\right) + 20\log\eta \quad \text{(Equation 2)}$$

Here, Gp is a normal gain, G'p is a gain converted to decibels, and $\eta$ is efficiency. In calculating a reflection gain for a GPS L1 signal using the relational expressions of Equations 1 and 2, when a square type reflector with a frequency f=1.6 G, a wavelength of about 0.2 m, and a reflector aperture of $8\times6$ $m^2$ is applied, Gp is about 93.56 dB. In addition, based on these analysis values, expected performance required when designing a reflector of the passive propagation mirror 210 may be derived additionally in consideration of reflection efficiency and the like.

Hereinafter, an apparatus of CRPA neutralization for an illegal UAV according to another exemplary embodiment of the present invention will be described with reference to FIG. 4. Compared with the exemplary embodiment of FIGS. 1 to 3, differences will be mainly described.

Figure 4:
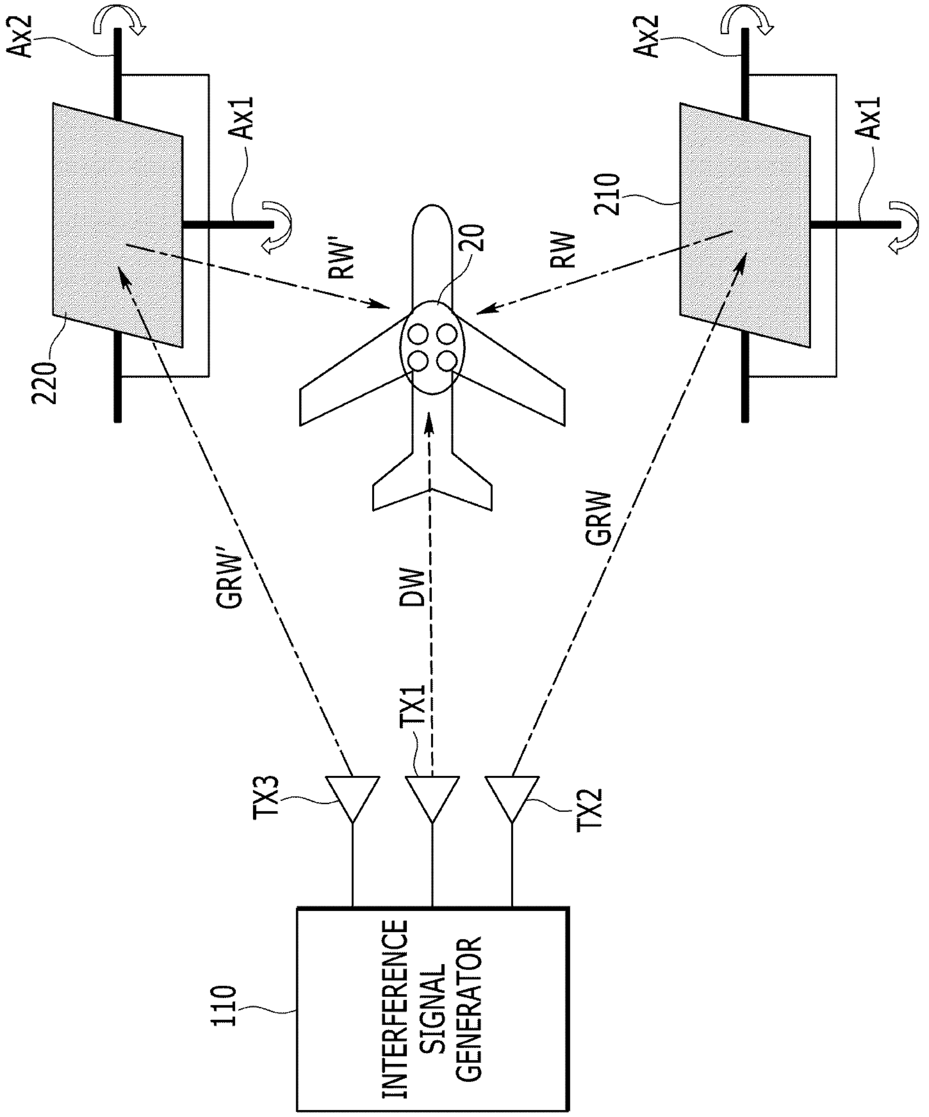
FIG. 4 is a view illustrating an apparatus of CRPA neutralization for an illegal UAV according to another exemplary embodiment of the present invention.

FIG. 4 is a view illustrating an apparatus of CRPA neutralization for an illegal UAV according to another exemplary embodiment of the present invention.

Referring to FIG. 4, an apparatus of CRPA neutralization for an illegal UAV may include an interference signal generator 110, a first passive propagation mirror 210, and a second passive propagation mirror 220 located in different areas. That is, the apparatus of CRPA neutralization for an illegal UAV may include a plurality of passive propagation mirrors 210 and 220.

The interference signal generator 110 may transmit a direct wave DW toward the CRPA 20 of the illegal UAV through the first transmission antenna TX1 and transmit a first reflected wave inducing signal GRW toward the first passive propagation mirror 210 through the second transmission antenna TX2 so that the first reflected wave RW propagates toward the CRPA 20 of the illegal UAV. In addition, the interference signal generator 110 may transmit a second reflected wave inducing signal GRW' toward the second passive propagation mirror 220 through the third transmission antenna TX3. The second reflected wave RW' may be reflected by the second passive propagation mirror 220 and propagate toward the CRPA 20 of the illegal UAV. In other words, the interference signal generator 110 may transmit the direct wave DW toward the CRPA 20 of the illegal UAV and propagate a plurality of reflected waves RW and RW' toward the CRPA 20 of the illegal UAV using the plurality of passive propagation mirrors 210 and 220. The direct wave DW and the plurality of reflected waves RW and RW' may be incident on the CRPA 20 of the illegal UAV in different directions to neutralize the CRPA 20.

The interference signal generator 110 may transmit the first reflected wave inducing signal GRW and the second reflected wave inducing signal GRW' to the first passive propagation mirror 210 and the second passive propagation mirror 220 only at a necessary time and position for the moving illegal UAV. That is, the first passive propagation mirror 210 and the second passive propagation mirror 220 may be arranged to propagate the reflected waves RW and RW' toward different points in an expected movement path of the illegal UAV, and the interference signal generator 110 may selectively transmit the first reflected wave inducing signal GRW and the second reflected wave inducing signal GRW' in response to the moving position of the illegal UAV. According to an exemplary embodiment, the interference signal generator 110 may simultaneously transmit the first reflected wave inducing signal GRW and the second reflected wave inducing signal GRW', or sequentially transmit the first reflected wave inducing signal GRW and the second reflected wave inducting signal GRW' according to a pre-programmed sequence.

The characteristics of the second transmission antenna TX2 and the first passive propagation mirror 210 described above in the exemplary embodiments of FIGS. 1 to 3 may be equally applied to the characteristics of the third transmission antenna TX3 and the second passive propagation mirror 220.

Hereinafter, an apparatus of CRPA neutralization for an illegal UAV according to another exemplary embodiment of the present invention will be described with reference to FIG. 5. Compared to the exemplary embodiment of FIGS. 1 to 3, differences will be mainly described.

Figure 5:
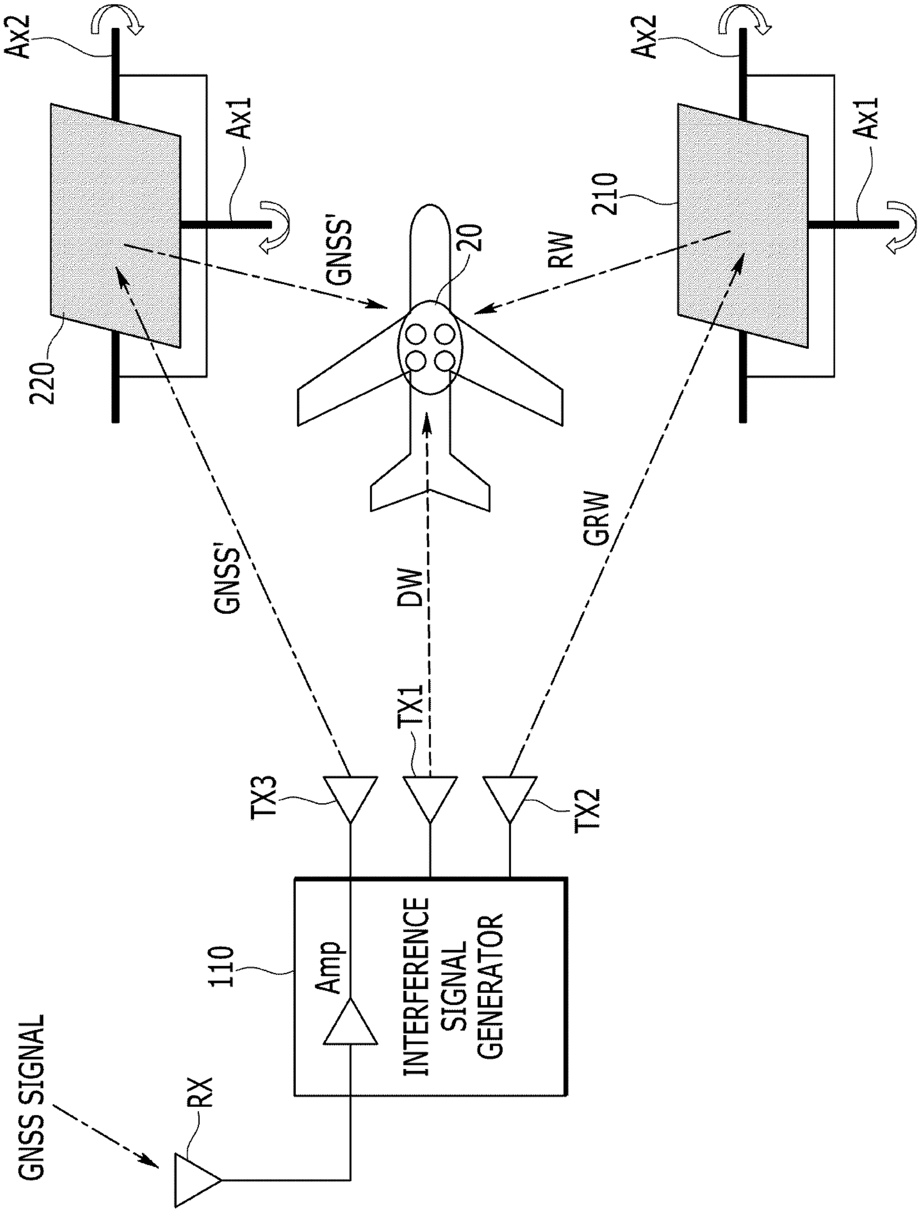
FIG. 5 is a view illustrating an apparatus of CRPA neutralization for an illegal UAV according to another exemplary embodiment of the present invention.

FIG. 5 is a view illustrating an apparatus of CRPA neutralization for an illegal UAV according to another exemplary embodiment of the present invention.

Referring to FIG. 5, the apparatus of CRPA neutralization for an illegal UAV may include an interference signal generator 110, a first passive propagation mirror 210, and a second passive propagation mirror 220 located in different areas, and after receiving a GNSS (Global Navigation Satellite System) signal (satellite signal), the interference signal generator 110 may perform rebroadcast jamming (or meaconing) of re-radiating.

The interference signal generator 110 may transmit a direct wave DW toward the CRPA 20 of the illegal UAV through the first transmission antenna TX1 and transmit the first reflected wave inducing signal GRW toward the first passive propagation mirror 210 through the second transmission antenna TX2 so that the first reflected wave RW propagates toward the CRPA 20 of the illegal UAV. In addition, the interference signal generator 110 may receive a GNSS signal through a reception antenna RX, amplify the received GNSS signal by an amplifier Amp to generate a GNSS re-radiation signal GNSS', and then transmit the GNSS re-radiation signal GNSS' toward the second passive propagation mirror 220 through the third transmission antenna TX3. The GNSS reradiation signal GNSS' may be reflected by the second passive propagation mirror 220 and propagate toward the CRPA 20 of the illegal UAV. The GNSS re-radiation signal GNSS' propagating by including a reflection path by the second passive propagation mirror 220 may further extend a pseudorange extension for the GNSS signal, thereby increasing a pseudorange error for the CRPA 20. rebroadcast jamming (or meaconing) technique of a GNSS signal (satellite signal) may cause jamming and positional error for a satellite navigation device to which the CRPA 20 is applied.

The characteristics of the second transmission antenna TX2 and the first passive propagation mirror 210 described above in the exemplary embodiments of FIGS. 1 to 3 may be equally applied to the characteristics of the third transmission antenna TX3 and the second passive propagation mirror 220.

Hereinafter, an apparatus of CRPA neutralization for an illegal UAV according to another exemplary embodiment of the present invention will be described with reference to FIG. 6. Compared to the exemplary embodiment of FIGS. 1 to 3, differences will be mainly described.

Figure 6:
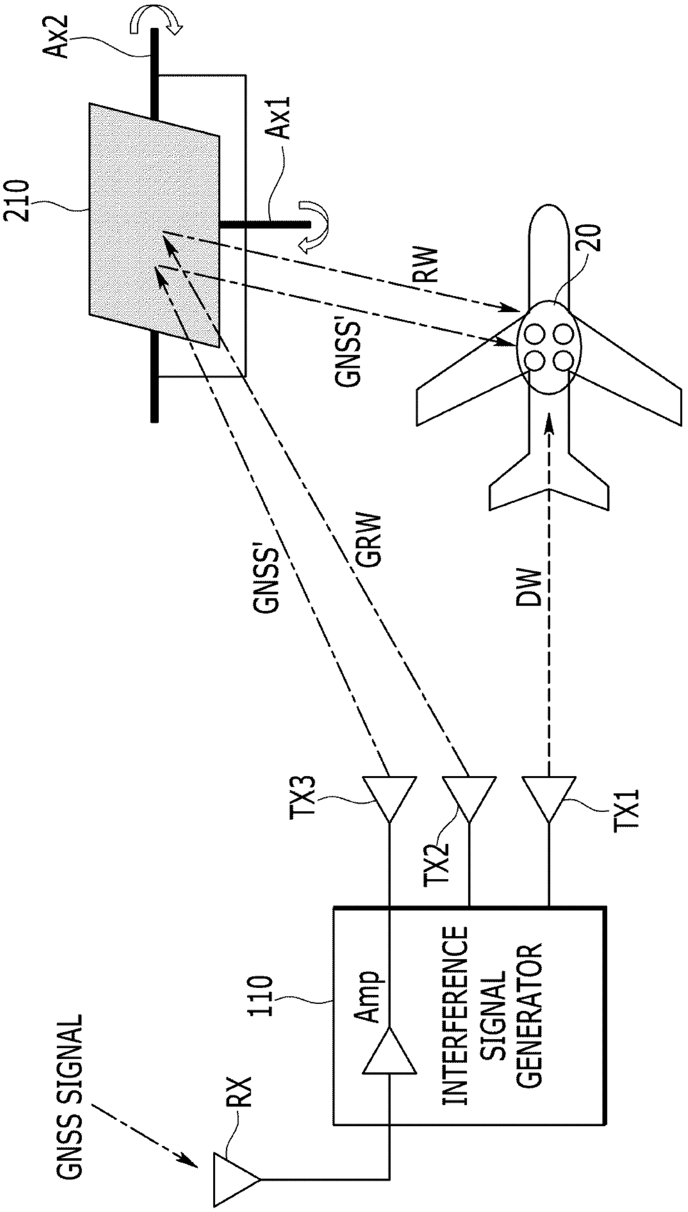
FIG. 6 is a view illustrating an apparatus of CRPA neutralization for an illegal UAV according to another exemplary embodiment of the present invention.

FIG. 6 is a view illustrating an apparatus of CRPA neutralization for an illegal UAV according to another exemplary embodiment of the present invention.

Referring to FIG. 6, the apparatus of CRPA neutralization for an illegal UAV may include the interference signal generator 110 and the passive propagation mirror 210 located in different areas, and the interference signal generator 110 may receive a GNSS signal (a satellite signal) and then perform rebroadcast jamming (or meaconing) of re-radiating.

The interference signal generator 110 may transmit the direct wave DW toward the CRPA 20 of the illegal UAV through the first transmission antenna TX1 and transmit the reflected wave inducing signal GRW toward the passive propagation mirror 210 through the second transmission antenna TX2 so that the reflected wave RW propagates toward the CRPA 20 of the illegal UAV. In addition, the interference signal generator 110 may receive a GNSS signal through a reception antenna RX, amplify the received GNSS signal with the amplifier Amp to generate a GNSS re-radiation signal GNSS', and then transmit the GNSS re-radiation signal GNSS' toward the passive propagation mirror 210 through the third transmission antenna TX3. The GNSS reradiation signal GNSS' may be reflected by the passive propagation mirror 210 and propagate toward the CRPA 20 of the illegal UAV. The propagated GNSS re-radiation signal GNSS' including the reflection path by the passive propagation mirror 210 may further extend a pseudorange extension for the GNSS signal, thereby extending a pseudorange error for the CRPA 20.

In other words, the interference signal generator 110 may transmit the reflected wave inducing signal GRW and the GNSS re-radiation signal GNSS' toward one passive propagation mirror 210 so that the reflected wave RW reflected by the passive propagation mirror 210 and the GNSS re-radiation signal GNSS' may propagate toward the CRPA 20 of the illegal UAV.

The characteristics of the second transmission antenna TX2 described above in the exemplary embodiments of FIGS. 1 to 3 may be equally applied to the characteristics of the third transmission antenna TX3.

Hereinafter, a method of CRPA neutralization for an illegal UAV according to an exemplary embodiment of the present invention will be described with reference to FIG. 7.

Figure 7:
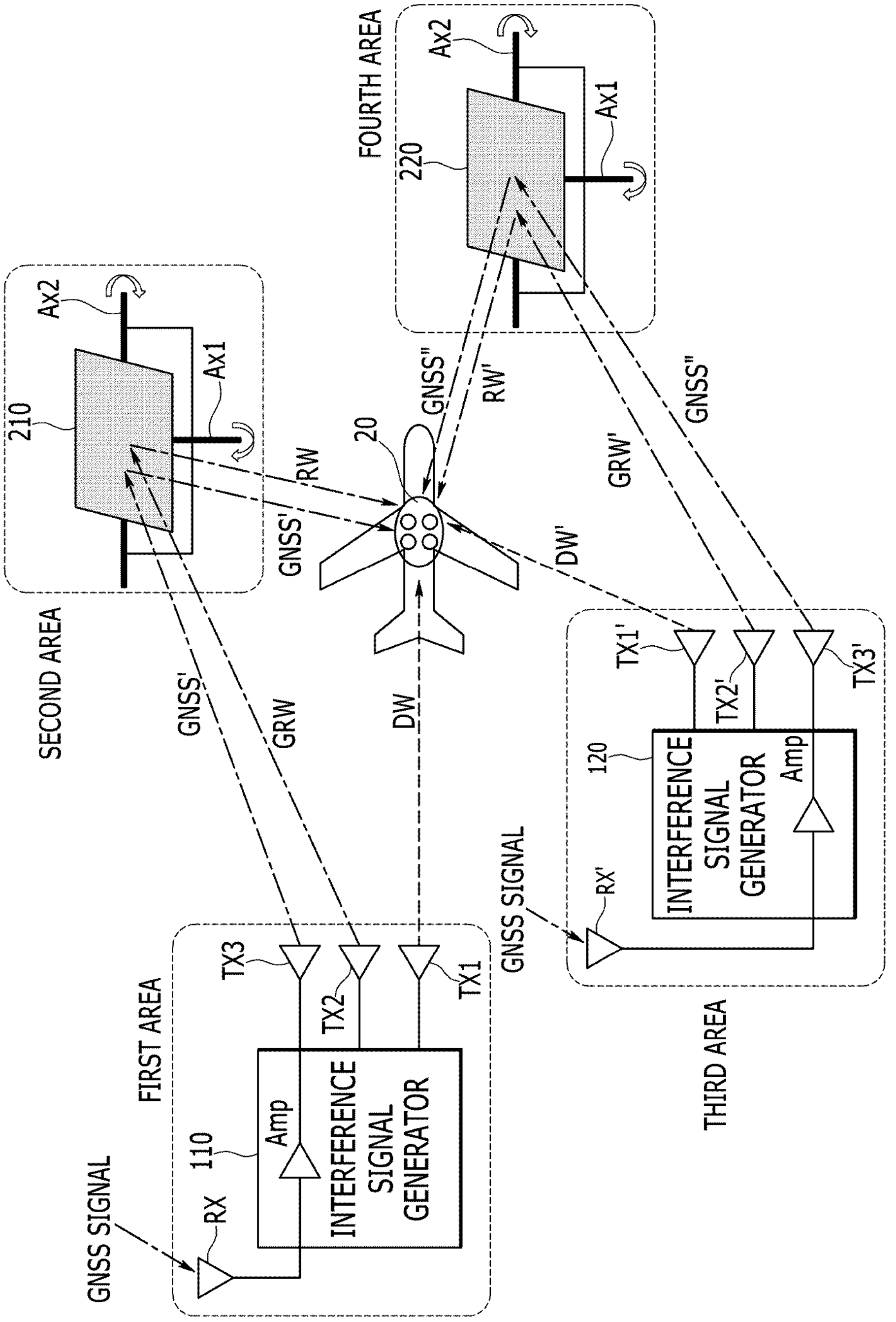
FIG. 7 is a view illustrating a method of CRPA neutralization for an illegal UAV according to an exemplary embodiment of the present invention.

FIG. 7 is a view illustrating a method of CRPA neutralization for an illegal UAV according to an exemplary embodiment of the present invention.

Referring to FIG. 7, the method of Method of CRPA neutralization for an illegal UAV according to an exemplary embodiment of the present invention is a method of overcoming a satellite navigation device to which the CRPA 20 based on an N-element array antenna that may be mounted and operated on a small illegal UAV known as a fatal threat expected worldwide is applied by applying the concept of passive propagation mirrors 210 and 220. This may have a very efficient advantage in terms of operability differentiated from the existing method that may neutralize the CRPA 20 of an illegal UAV, which is a threat target, by minimizing the number of physical RF interference signal transmitters in operation.

It is assumed that an illegal UAV is equipped with a 4-element CRPA 20.

The first interference signal generator 110 is installed in a first area, the first passive propagation mirror 210 is installed in a second area, the second interference signal generator 120 is installed in a third area, and the second passive propagation mirror 220 is installed in a fourth area.

The first area and the third area may be areas, such as a city center equipped with infrastructure, such as accessibility for equipment operators and large-capacity power supply, and may be areas in which GNSS high-power jammer operation is easy in reality. Meanwhile, the second area and the fourth area may be mountainous regions in which it is not easy to operate high-power RF equipment or areas in which it is difficult to install, operate, and permit an L-band radio wave transmission device for GNSS. Since the first passive propagation mirror 210 and the second passive propagation mirror 220 may be installed in the second and fourth areas in which it is impossible to directly install and operate high-power jammer equipment, the penetration of illegal UAVs may be effectively prevented even in these areas.

The first interference signal generator 110 may transmit a direct wave DW toward the CRPA 20 of the illegal UAV through the first transmission antenna TX1 in the manner described above with reference to FIG. 6, and transmit a reflected wave inducing signal GRW toward the first passive propagation mirror 210 through the second transmission antenna TX2, so that the reflected wave RW propagates toward the CRPA 20 of the illegal UAV. Also, the first interference signal generator 110 may receive a GNSS signal through the reception antenna RX, amplify the received GNSS signal with the amplifier Amp to generate a GNSS re-radiation signal GNSS', and then transmits the GNSS re-radiation signal GNSS' toward the first passive propagation mirror 210 through the third transmission antenna TX3. The GNSS re-radiation signal GNSS' may be reflected by the first passive propagation mirror 210 and propagate toward the CRPA 20 of the illegal UAV.

The second interference signal generator 120 may transmit the direct wave (DW') toward the CRPA 20 of the illegal UAV through the first transmission antenna TX1' and transmit the reflected wave inducing signal GRW' toward the second passive propagation mirror 220 through the second transmission antenna TX2' in the similar manner as that described above with reference to FIG. 6, so that the reflected wave RW' may propagate toward the CRPA 20 of the illegal UAV. In addition, the second interference signal generator 120 may receive the GNSS signal through the reception antenna RX', amplify the received GNSS signal with the amplifier Amp to generate a GNSS re-radiation signal GNSS", and then transmit the GNSS re-radiation signal GNSS" toward the second passive propagation mirror 220 through a third transmission antenna TX3'. The GNSS reradiation signal GNSS" may be reflected by the second passive propagation mirror 220 and propagate toward the CRPA 20 of the illegal UAV.

Although FIG. 7 illustrates a method of neutralizing the CRPA 20 of an illegal UAV using the apparatus of CRPA neutralization for the illegal UAV of FIG. 6, at least one of the exemplary embodiment of FIG. 1, the exemplary embodiment of FIG. 4, the exemplary embodiment of FIG. 5, and the exemplary embodiment of FIG. 6 may be installed/used in a complex manner to neutralize the CRPA 20 of an illegal UAV.

The direct waves DW and DW' and the reflected waves RW and RW' incident in four different directions may exceed the degree of freedom (DOF) condition of the four-element CRPA 20 of the illegal UAV to neutralize the CRPA 20. In addition, the GNSS re-radiation signals GNSS' and GNSS" may further extend a pseudorange extension for the GNSS signal, thereby extending a pseudorange error for the CRPA 20.

The method of CRPA neutralization for an illegal UAV according to an exemplary embodiment of the present invention may neutralize the CRPA 20 of an illegal UAV by operating physical high-power RF interference signal sources, that is, the interference signal generators 110 and 120, which are fewer than N−1 interference signal sources, which are DOF conditions of an array antenna adaptive signal processing technology known as the number of simultaneously responding interference sources, so that the an illegal UAV equipped with a miniaturized CRPA 20 may be neutralized. That is, the method of CRPA neutralization for an illegal UAV is a CRPA 20 countermeasure technique using the minimum number of interference signal generators 110 and 120 using non-power passive propagation mirrors 210 and 220.

The method of CRPA neutralization for an illegal UAV according to an exemplary embodiment of the present invention uses a theoretical limit based on the constraint of a null steering or beam steering algorithm that transforms and applies array signal processing based on an N-element antenna to GPS CRPA, and uses a theoretical limit of a technical response to the number of jammers in different directions in the general nulling CRPA algorithm. This theory is explained using mathematical axioms as follows.

The degree of freedom (DOF) in an array antenna refers to the number of sets of weights capable of synthesizing beams (or nulls) in a desired direction, which is equal to the number N of array antenna elements. Also, if the weight set $w=[0\ 0]^T$, which is a general trivial solution, is excluded, the number of available sets becomes N−1 according to a mathematical axiom in which one constraint is reduced. A gain of the array antenna under these conditions may be expressed as Equation 3, which is a function of a direction of an input signal and the weight w. A gain function of an array antenna is a combination of an input signal direction and a weight.

$$f(\theta,\phi,\omega)=\tilde{\omega}_1+\tilde{\omega}_2 e^{-j\phi_2(\theta,\phi,\omega)}+\ldots+\tilde{w}_N e^{-j\phi_N(\theta,\phi,\omega)} \quad \text{(Equation 3)}$$

Here, θ denotes an elevation angle, ϕ denotes an azimuth angle, ω denotes an angular frequency, and $\phi_N$ denotes a direction component on which an Nth signal is incident.

In general, a power minimization algorithm applied to the CRPA 20 operates to fix a reference antenna weight to unit gain "1" and remove L GNSS interference signals at the same time, and thus, it may be expressed as a determinant such as Equation 4.

$$\begin{bmatrix} 1 & e^{-j\phi_2(\theta_1,\phi_1,\omega_1)} & \ldots & e^{-j\phi_N(\theta_1,\phi_1,\omega_1)} \\ 1 & e^{-j\phi_2(\theta_2,\phi_2,\omega_2)} & \ldots & e^{-j\phi_N(\theta_2,\phi_2,\omega_2)} \\ \vdots & \vdots & \ddots & \vdots \\ 1 & e^{-j\phi_2(\theta_L,\phi_L,\omega_L)} & \ldots & e^{-j\phi_N(\theta_L,\phi_L,\omega_L)} \end{bmatrix} \begin{bmatrix} 1 \\ \tilde{w}_2 \\ \vdots \\ \tilde{w}_N \end{bmatrix} = \begin{bmatrix} 0 \\ 0 \\ \vdots \\ 0 \end{bmatrix} \quad \text{(Equation 4)}$$

Here, N is the number of antenna elements and L is the number of interference signals. Also, there should be a weight W that satisfies the right side of Equation 4. In order to calculate a solution that satisfies these conditions, in the relationship between the number of equations L and the number of unknowns N−1 in Equation 4, the unknowns may be solved for a case in which L≤N−1 is satisfied, and thus, the number of interference signals (jammers) that may be processed by the signal processing technique in the CRPA 20 may be induced to be limited to a maximum of N−1.

A weight vector solution that may be calculated through Equations 3 and 4 may be expressed in the form of an optimal solution as shown in Equation 5 below.

$$W_{optimal}=R^{-1}\times\delta \quad \text{(Equation 5)}$$

Here, $w_{optimal}$ is an optimal weight vector, and R is a covariance matrix of an array antenna or a correlation matrix for an input sample and may be expressed as@@@, including constraints on a reference antenna.

For the CRPA 20, a null steering or beam steering algorithm operates for an external signal received above a noise level of a receiver. Using this principle, the CRPA 20 may be neutralized using the passive propagation mirrors 210 and 220 capable of reflecting signals higher than the noise level in consideration of spatial loss for radio waves. For example, in the case of the basic 4-element CRPA 20, the CRPA 20 may be neutralized using two interference signal generators 110 and 120 corresponding to N−2 high-power RF interference sources and two passive radio propagation mirrors 210 and 220. If the CRPA 20 is an extended type with 8 elements, an electronic attack scenario exceeding N−1 degree of freedom condition may be developed by operating 4 levels of N−4 RF interference signal sources (jammers) and 4 passive propagation mirrors.

As an example of specific application, areas (the first area and the third area) in which the interference signal generators 110 and 120 (interference signal sources) may be operated and areas (the second area and the fourth area) in which the interference signal generators 110 and 120 cannot be operated may be distinguished from each other by recognizing an expected attack path of an illegal UAV equipped with the CRPA 20 for major facilities or targets and considering the number of GNSS interference sources that may be actually operated. For an operation of an interference signal source to cope with an actual illegal UAV, an area in which a physical high-power RF interference signal source is to be operated and the passive propagation mirrors 210 and 220 for inducting a reflected signal may be disposed such that visibility of the reflected wave inducing signals GRW and GWR' and the passive propagation mirrors 210 and 220 are secured in an expected flight path section by predicting an expected appearance and departure point of the illegal UAV according to the size of the equipment and the requirements for operation (altitude, directionality, power supply, influence of surrounding radio interference, etc.).

In general, a 4-element CRPA 20 is applied to small aero vehicles, such as drones. Based on this, the two interference signal generators 110 and 120, which are high-power RF generators, are placed in the optimal positions analyzed by the operator, and the corresponding passive propagation mirrors 210 and 220 may be installed in the corresponding section and operate. In addition, a preemptive defense area for an expected flight trace of an illegal UAV may be established, and may be set and operated as a drone safety dome area. If an illegal UAV (drone) appears in the drone safety dome area, it may be detected and precisely tracked by a smart drone detection system, such as low-altitude radar or EO/IR, and in the case of a detour flight to an area outside the drone safety dome area, a protection area or section may be artificially changed by adjusting the azimuth and elevation angles of an additional passive propagation mirror or an existing reflector.

In the method of CRPA neutralization for an illegal UAV according to an exemplary embodiment of the present invention, regardless of the number N of array elements of CRPA 20, an illegal UAV may be neutralized by extending a response area to remote areas including mountainous areas by a relatively small number of RF transmitters (jammers) based on the N−1 reference of the degree of freedom condition, which is a basic measure of CRPA performance.

The drawings referred to and the detailed descriptions of the present invention are merely illustrative and have been used to describe the present invention but not intended to limit the scope of the present invention described in claims. Therefore, those skilled in the art will appreciate that various modifications, additions and substitutions are possible, without departing from the scope and spirit of the disclosure as disclosed in the accompanying claims. Therefore, the technical scope of the present invention should be defined by the technical spirit and scope of the accompanying claims.

What is claimed is:

1. An apparatus of controlled reception pattern antenna (CRPA) neutralization for an illegal unmanned aerial vehicle (UAV), the apparatus comprising:

an interference signal generator transmitting a direct wave toward a CRPA of an illegal UAV through a first transmission antenna and transmitting a first reflected wave inducing signal through a second transmission antenna; and a first passive propagation mirror reflecting the first reflected wave inducing signal toward the illegal UAV so that the first reflected wave propagates toward the CRPA of the illegal UAV, wherein the first passive propagation mirror is configured to rotate a reflector in an azimuth direction with respect to a first axis and tilt the reflector in an elevation direction with respect to a second axis.

2. The apparatus of claim 1, wherein:

the interference signal generator and the first passive propagation mirror are located at a long distance on a line of sight so that the direct wave and the first reflected wave are incident on the CRPA of the illegal UAV in different directions.

3. The apparatus of claim 1, further comprising:

a second passive propagation mirror located in a different area from the interference signal generator and the first passive propagation mirror, wherein the interference signal generator transmits a second reflected wave inducing signal through a third transmission antenna, and the second passive propagation mirror reflects the second reflected wave inducing signal toward the illegal UAV so that the second reflected wave propagates toward the CRPA of the illegal UAV.

4. The apparatus of claim 1, further comprising:

a second passive propagation mirror located in a different area from the interference signal generator and the first passive propagation mirror, wherein the interference signal generator receives a satellite signal through a reception antenna, amplifies the satellite signal to generate a re-radiation signal, and transmits the re-radiation signal through a third transmission antenna, and the second passive propagation mirror reflects the re-radiation signal toward the CRPA of the illegal UAV.

5. The apparatus of claim 1, wherein:

the interference signal generator receives a satellite signal through a reception antenna, amplifies the satellite signal to generate a re-radiation signal, and transmits the re-radiation signal toward the first passive propagation mirror through a third transmission antenna, and the first passive propagation mirror reflects the re-radiation signal toward the CRPA of the illegal UAV.

6. An apparatus of controlled reception pattern antenna (CRPA) neutralization for an illegal unmanned aerial vehicle (UAV), the apparatus comprising:

a first interference signal generator installed in a first area;

a first passive propagation mirror installed in a second area;

a second interference signal generator installed in a third area; and a second passive propagation mirror installed in a fourth area, wherein the first interference signal generator transmits a first direct wave toward the CRPA of the illegal UAV and transmits a first reflected wave inducing signal toward the first passive propagation mirror so that a first reflected wave propagates toward the CRPA of the illegal UAV, and the second interference signal generator transmits a second direct wave toward the CRPA of the illegal UAV and transmits a second reflected wave inducing signal toward the second passive propagation mirror so that a second reflected wave propagates toward the CRPA of the illegal UAV.

7. The apparatus of claim 6, wherein:

the first interference signal generator amplifies a satellite signal received through a reception antenna to generate a first re-radiation signal, and transmits the first re-radiation signal toward the first passive propagation mirror so that the first re-radiation signal reflected by the first passive propagation mirror propagates toward the CRPA of the illegal UAV.

8. The apparatus of claim 6, wherein:

the second interference signal generator amplifies a satellite signal received through a reception antenna to generate a second re-radiation signal, and transmits the second re-radiation signal toward the second passive propagation mirror so that the second re-radiation signal reflected by the second passive propagation mirror propagates toward the CRPA of the illegal UAV.

9. A method of CRPA neutralization for an illegal unmanned aerial vehicle (UAV), the method comprising:

transmitting a direct wave, by an interference signal generator installed in a first area, to a CRPA of an illegal UAV and transmitting a first reflected wave inducing signal to a first passive propagation mirror installed in a second area; and reflecting, by the first passive propagation mirror, the first reflected wave inducing signal toward the illegal UAV so that the first reflected wave propagates toward the CRPA of the illegal UAV, wherein the first passive propagation mirror is configured to rotate a reflector in an azimuth direction with respect to a first axis and tilt the reflector in an elevation direction with respect to a second axis.

10. The method of claim 9, further comprising:

transmitting, by the interference signal generator, a second reflected wave inducing signal toward a second passive propagation mirror installed in a third area; and Reflecting, by the second passive propagation mirror, the second reflected wave inducing signal toward the illegal UAV so that the second reflected wave propagates toward the CRPA of the illegal UAV.

11. The method of claim 9, further comprising:

receiving, by the interference signal generator, a satellite signal through a reception antenna, amplifying the satellite signal to generate a re-radiation signal, and transmitting the re-radiation signal toward a second passive propagation mirror installed in a third area; and reflecting, by the second passive propagation mirror, the re-radiation signal toward the CRPA of the illegal UAV.

12. The method of claim 9, further comprising:

receiving, by the interference signal generator, a satellite signal through a reception antenna, amplifying the satellite signal to generate a re-radiation signal, and then transmitting the re-radiation signal toward the first passive propagation mirror; and reflecting, by the first passive propagation mirror, the re-radiation signal toward the CRPA of the illegal UAV.

13. A method of controlled reception pattern antenna (CRPA) neutralization for illegal unmanned aerial vehicle (UAV), the method comprising:

transmitting, by a first interference signal generator installed in a first area, a first direct wave to a CRPA of an illegal UAV and transmitting a first reflected wave inducing signal to a first passive propagation mirror installed in a second area;

reflecting, by the first passive propagation mirror, the first reflected wave inducing signal toward the illegal UAV so that the first reflected wave propagates toward the CRPA of the illegal UAV;

transmitting, by a second interference signal generator installed in a third area, a second direct wave toward the CRPA of the illegal UAV and transmitting a second reflected wave inducing signal toward a second passive propagation mirror installed in a fourth area; and reflecting, by the second passive propagation mirror, the second reflected wave inducing signal toward the illegal UAV so that the second reflected wave propagates toward the CRPA of the illegal UAV.

14. The method of claim 13, further comprising:

amplifying, by the first interference signal generator, a satellite signal received through a reception antenna to generate a first re-radiation signal, and then transmitting the first re-radiation signal toward the first passive propagation mirror; and reflecting, by the first passive propagation mirror, the first re-radiation signal toward the CRPA of the illegal UAV.

15. The method of claim 13, further comprising:

amplifying, by the second interference signal generator, a satellite signal received through a reception antenna to generate a second re-radiation signal, and then transmitting the second re-radiation signal toward the second passive propagation mirror; and reflecting, by the second passive propagation mirror, the second re-radiation signal toward the CRPA of the illegal UAV.

* * * * *